United States Patent [19]

Cramer et al.

[11] Patent Number: 4,622,891

[45] Date of Patent: Nov. 18, 1986

[54] SANDWICH COOKIES, APPARATUS FOR MAKING SAME

[75] Inventors: Clarence W. Cramer, Burlington; Roelof deVries, Haddonfield, both of N.J.

[73] Assignee: Campbell Soup Company, Camden, N.J.

[21] Appl. No.: 693,135

[22] Filed: Jan. 22, 1985

[51] Int. Cl.$^4$ .............................................. A21C 9/04
[52] U.S. Cl. .................................. 99/450.4; 99/450.7
[58] Field of Search ................ 99/450.1, 450.2, 450.4, 99/450.6, 450.7, 516, 517; 426/524, 274; 118/13, 20, 24, 25

[56] References Cited

U.S. PATENT DOCUMENTS

| | | | |
|---|---|---|---|
| 2,260,686 | 10/1941 | Segrin | 99/450.4 |
| 2,923,257 | 2/1960 | Monaco | 99/450.4 |
| 2,947,266 | 8/1960 | Farrer | 99/450.4 |
| 4,513,656 | 4/1985 | Fay | 99/450.4 |

*Primary Examiner*—Timothy F. Simone
*Attorney, Agent, or Firm*—Albert L. Free

[57] ABSTRACT

A sandwich cookie is made of a chocolate-coated bottom biscuit and a plain top biscuit by applying a pair of stripes of molten chocolate to the chocolate-coated surface of the bottom biscuit, placing the biscuits against each other, and cooling the molten chocolate to set it and bond together the top and bottom biscuits to form the desired chocolate sandwich cookie. Apparatus is provided for performing these steps automatically on rapidly-moving trains of top and bottom biscuits. Stepping conveyors and synchronized lugged conveyors move each top biscuit into vertical alignment with a corresponding coated and striped bottom biscuit, whereupon the top biscuit is dropped upon the bottom biscuit and passed beneath a presser spring which urges the top and bottom cookies toward each other prior to cooling of the molten stripes. The bottom biscuits are initially provided with the chocolate coating on their bottom surfaces, and are turned over prior to application to them of the top biscuits, by means of synchronously rotating inverter wheels having recesses for receiving the bottom biscuits and for carrying them around to an inverted, coated-side-up, position prior to their discharge onto the conveyor.

11 Claims, 24 Drawing Figures

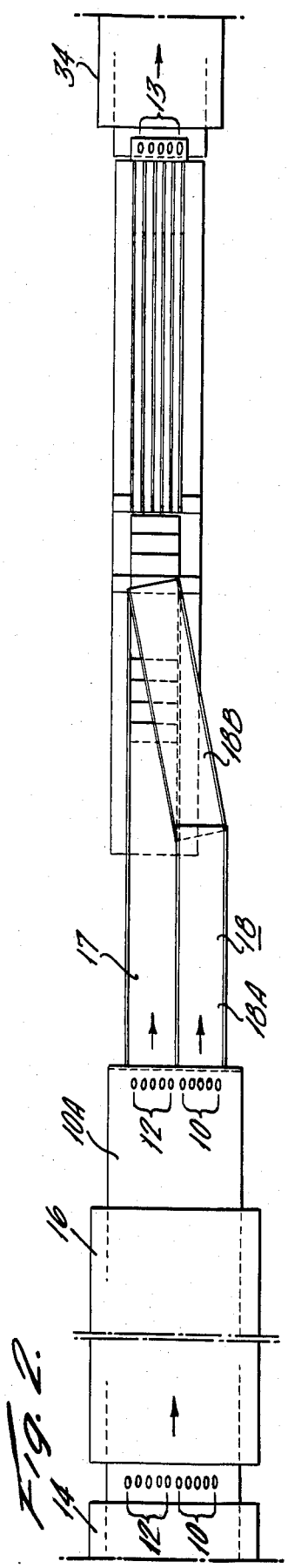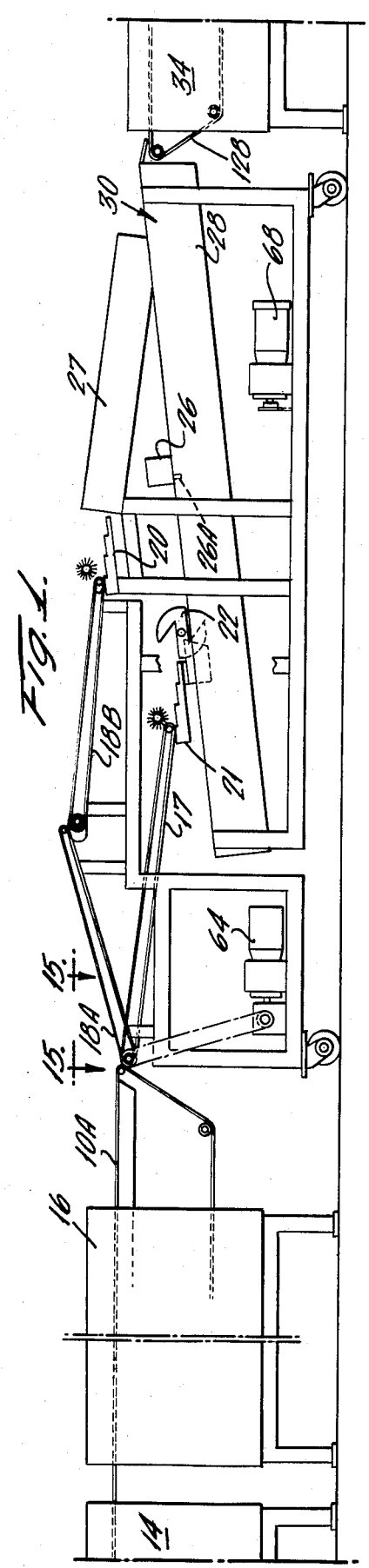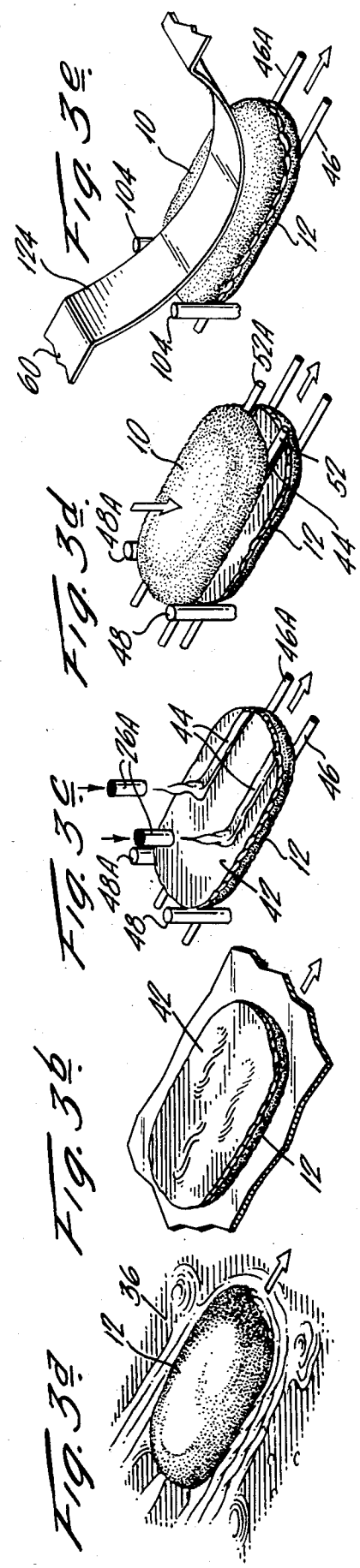

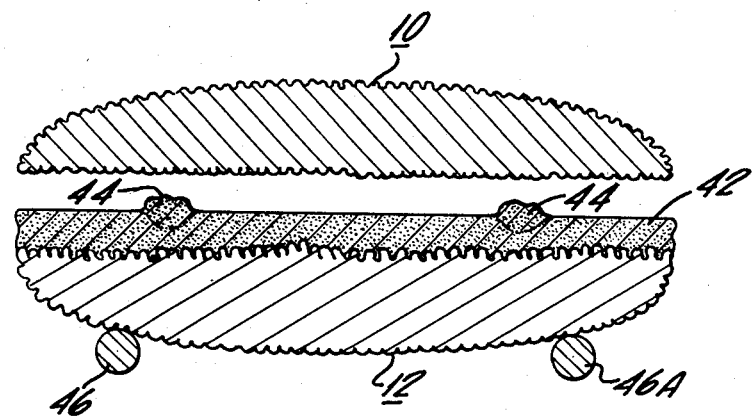
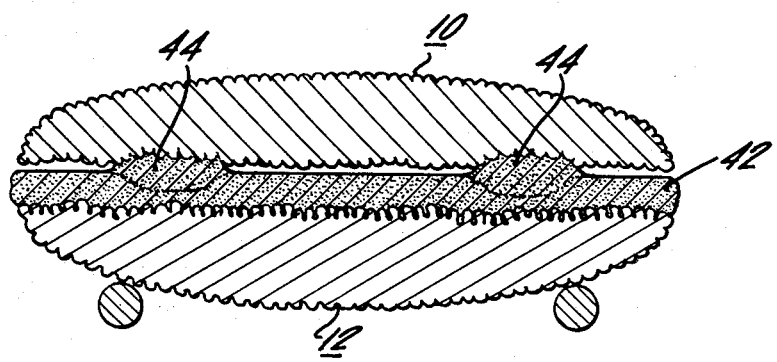
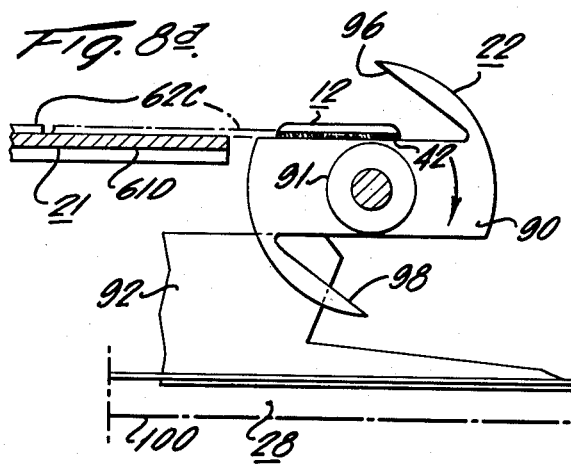
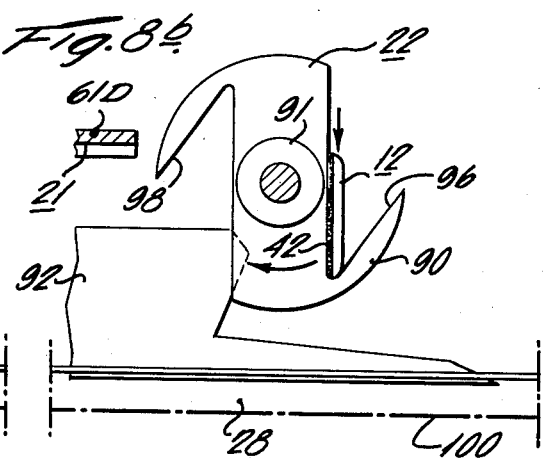
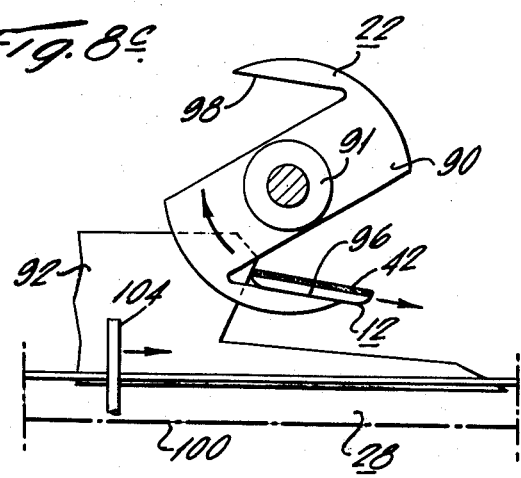
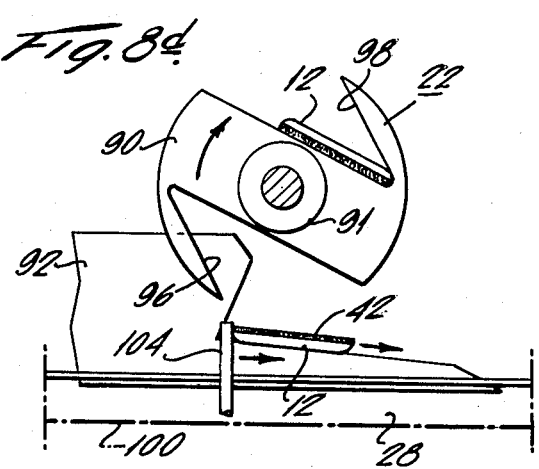

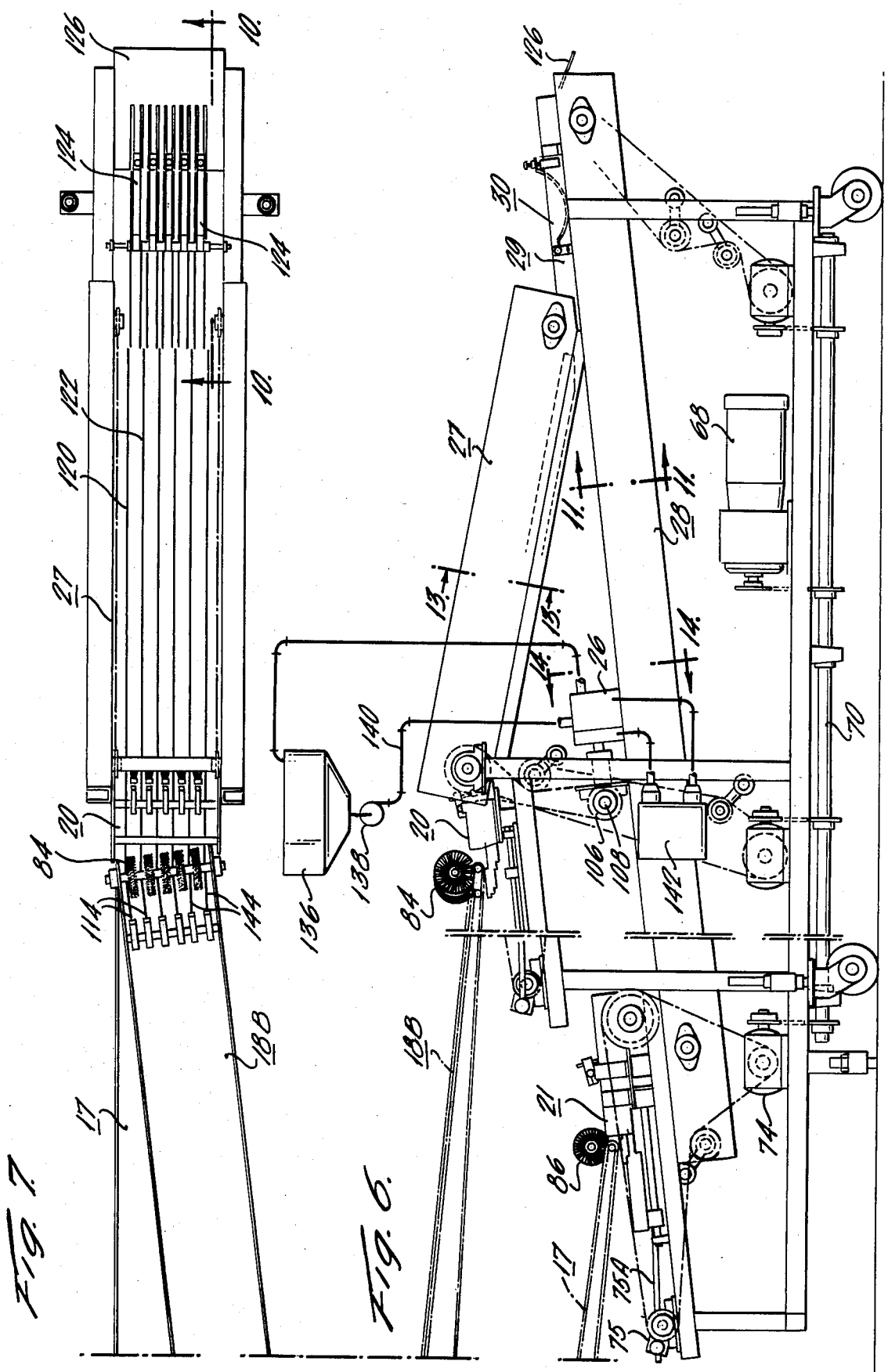

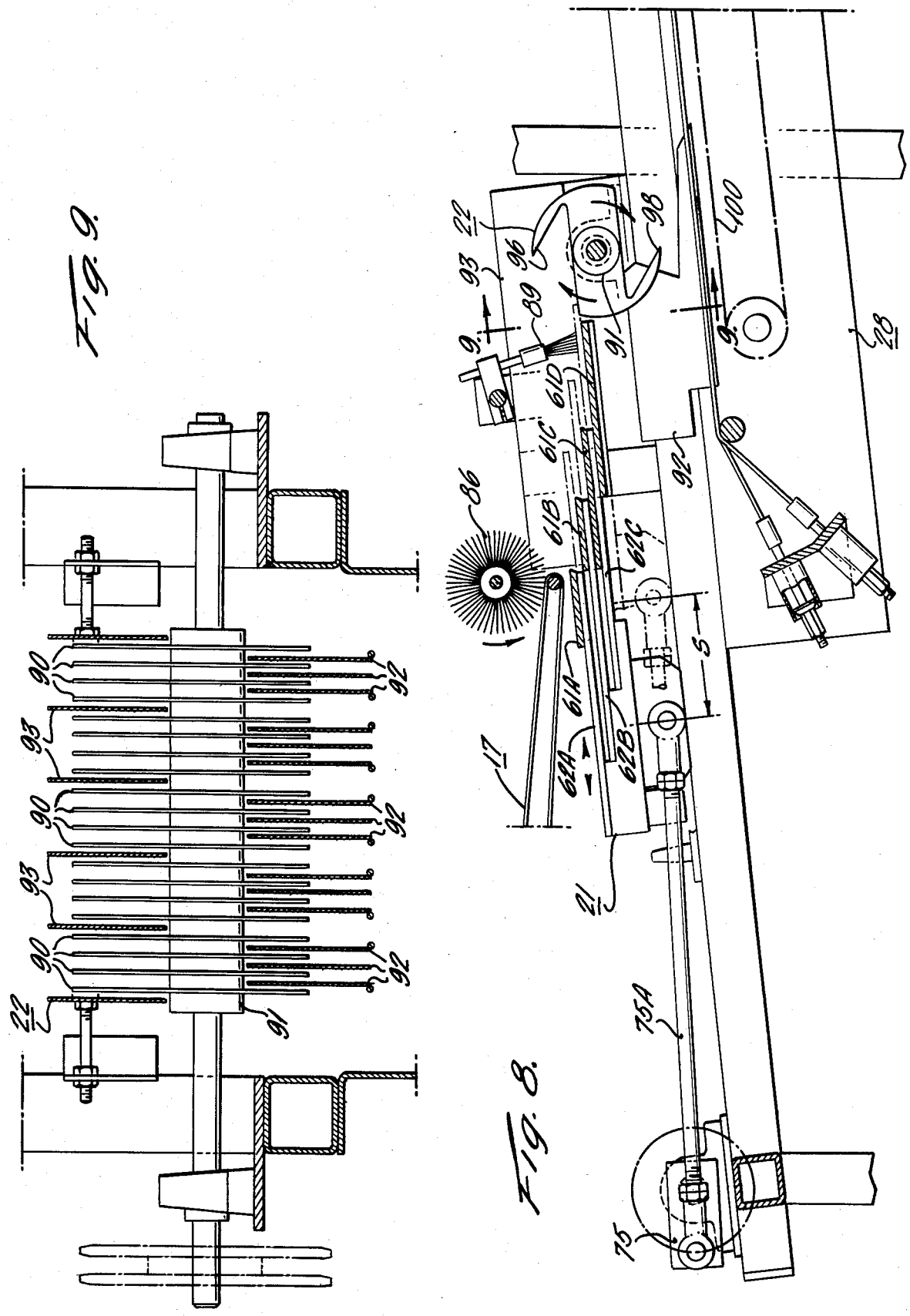

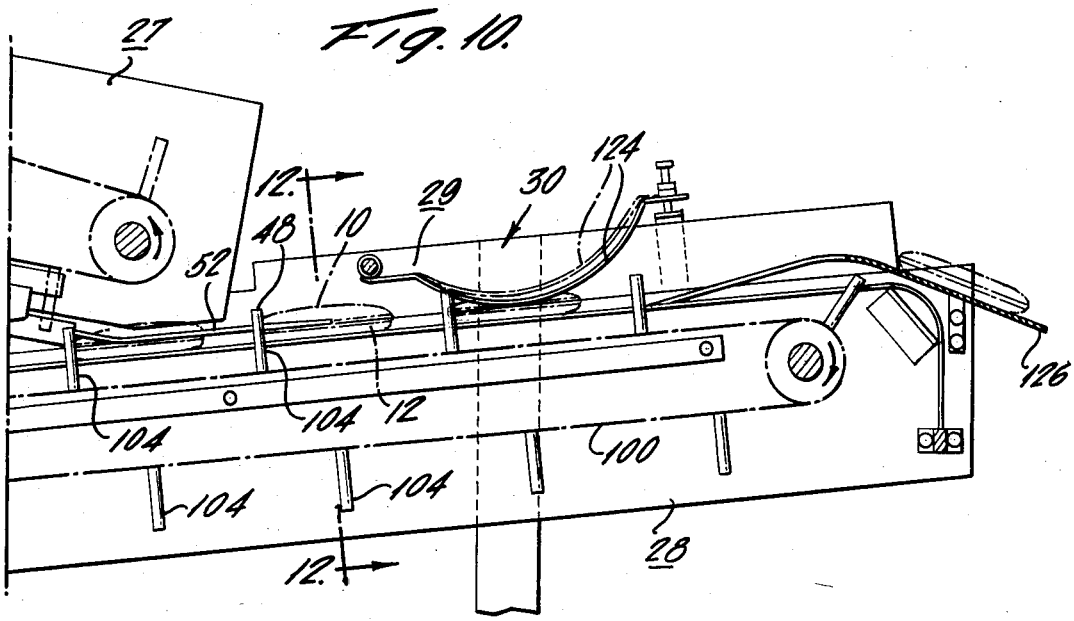
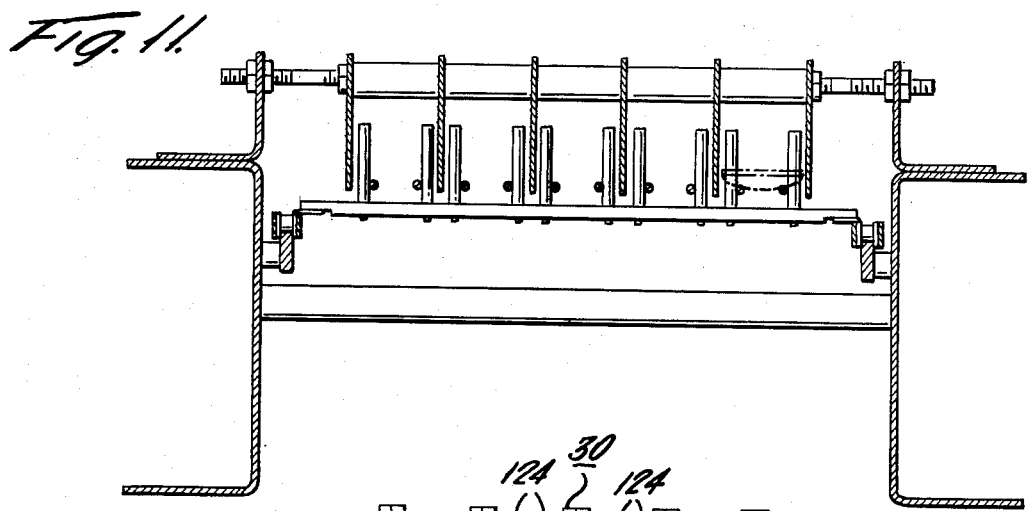
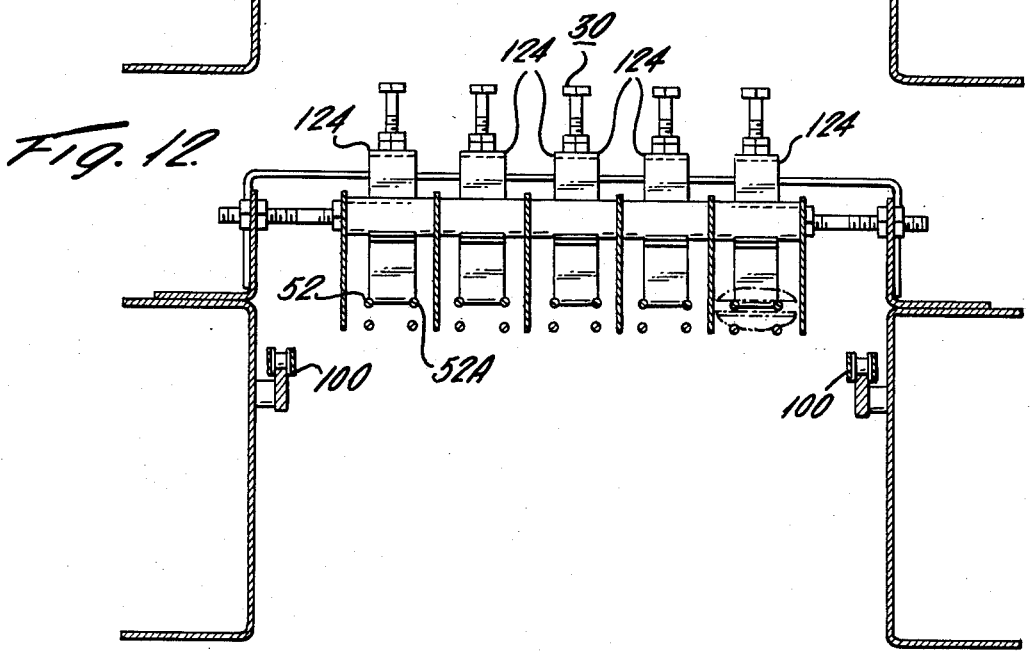

SANDWICH COOKIES, APPARATUS FOR MAKING SAME

BACKGROUND OF THE INVENTION

A popular type of cookie, designated herein as a sandwich cookie, consists of two cookie biscuits with a filling material between them. The biscuits may be thick and rounded, with confronting surfaces which are generally parallel and flat, but they may have other shapes as well, for example a simple disk form.

Methods and apparatus are already known in the art for coating one surface of a cookie biscuit with a thin layer of molten chocolate and then presenting it, coated side up, for manual application thereto of another biscuit before the chocolate layer has solidified; upon subsequent cooling, the chocolate layer serves as a solidified filler bonding the biscuits together.

One machine known in the art for providing the necessary chocolate coating is commonly designated as an enrober, and involves, in effect, floating the cookie biscuits, flat side down, across the surface of a bath of chocolate, with a wire mesh below the biscuits, after which the coated discuits are automatically lifted from the bath and tumbled over so that their coated surfaces are presented upwardly. At this point, while the chocolate is still soft, another biscuit is manually placed on the chocolate layer of each coated biscuit. Upon subsequent cooling to solidify the chocolate, the cookie sandwiches are completed.

Such manual application of the top biscuit is labor intensive and hence costly; in addition it has proved to be rather messy in that, rather quickly, the fingers of the workers and the equipment around the cookie-making line become spattered and coated with the liquid chocolate, requiring frequent clean-up procedures. The time and labor involved in such clean-up add further expense to the production procedure.

It has therefore been desirable to provide a method and apparatus for manufacturing sandwich cookies commercially at high speeds, at reduced expense, and with a less messy procedure. Heretofore, so far as is known to applicant, this has not been achieved in the case of sandwich cookies utilizing a chocolate filler. This is primarily because, to achieve an appropriate bond between the biscuits, the chocolate must be molten, or at least soft, when the biscuits are placed together; if it is not, it does not have the cementing properties necessary to achieve the desired bonding. On the other hand, it has been found impractical, or at least messy and expensive, to move along an automatic production line biscuits having molten chocolate layers on them, and to apply the other biscuits automatically to the molten chocolate layers "on the fly", that is, while both the coated and uncoated biscuits are moving along the production line.

Furthermore, while it might be thought that one could coat a biscuit with chocolate, solidify the chocolate to provide a hard coating, and then momentarily soften the coating just before the other biscuit is to be applied to it to achieve the desired bonding, in the case of a chocolate filling this is particularly difficult, and thus far has not been found practical. This is primarily for the reason that, if the chocolate is softened by heating it, then upon resolidifying it loses some of its desirable properties; for example, it is likely to experience some whitening, as well as some degradation in consistency, such as not rehardening for example. The danger of excessive extrusion or flow of some of the chocolate layer outwardly onto the sides of the biscuits also exists when attempting to use such apparatus and procedures.

Accordingly, it is an object of the present invention to provide new and useful method and apparatus for the production of sandwich-type cookies, especially of the type in which the filler material is chocolate, as well as a new and useful cookie made by such method and apparatus.

Another object is to provide such method and apparatus which are efficient and reliable.

A further object is to provide such method and apparatus which are economical to employ.

It is also an object to provide such method and apparatus which do not result in the undesired dispersion of filler material, especially chocolate, onto the apparatus or operating personnel.

A still further object is to provide a novel sandwich cookie.

SUMMARY OF THE INVENTION

In accordance with the invention, these and other objects are achieved by the provision of method and apparatus for producing a sandwich-type cookie in which a coating of a heated flowable edible material is applied to one side of a first cookie biscuit and subsequently cooled to harden the coating and to bond it to that biscuit; thereafter, a molten of deposit an edible food material is applied to a part only of the solidified chocolate coating and/or to a part of a second cookie biscuit, and the second cookie biscuit placed against the solidified coating with the molten deposit between the coating and the second biscuit. Upon subsequent setting of the molten deposit, the two halves of the cookie sandwich become appropriately bonded to each other, without any degradation of the coating material.

In the preferred embodiment of the invention the coating and the molten deposit are both of a chocolate material, so that the final filler is all of chocolate material and yet the sandwich has been appropriately bonded together by a method which can be completely mechanized.

Thus, in apparatus according to the invention, there are preferably provided means for moving a first train of chocolate-cookie biscuits progressively along a conveyor with the hardened chocolate coating of each presented upwardly, means for moving a second train of cookie biscuits along the conveyor, means for dispensing a cementitious food material (preferably additional molten chocolate) upon part of each biscuit in said first train and/or in said second train, and means for applying each of the biscuits of said second train to a corresponding one of the biscuits of the first train while the cementitious material between them is still not completely set, whereby upon subsequent cooling of the cementitious material to set it, the desired bonded sandwich cookies are produced.

Preferably the biscuits in said first train are moved through the conveyor with their chocolate-coated sides upward, at least just prior to application of the biscuits of the second train, the applying of the second train to the biscuits of the first train is by means which drop one of each of the biscuits of the second train onto a corresponding biscuit of the first train, and the cementitious material is molten chocolate dispensed onto parts of the solidified chocolate layers on the biscuits of the first train, the dispensed molten chocolate preferably being in the form of one or more stripes.

The preferred embodiment of the apparatus according to the invention also comprises a number of subsidiary features and combinations which contribute to best production operation. One of these involves use of a particularly effective mechanism for turning the coated biscuits from a coated-side-down position to a coated-side-up position, with reliability and in exact synchronization with the forward motion of the various cookie biscuits on the conveyor; also preferably employed is an arrangement of reciprocating pusher plates to assist in maintaining the desired phase synchronization between the dispensing of the cementitious chocolate material and the passage of the cookie biscuits beneath the dispenser, operating in combination with an arrangement of lugged conveyor chains for assisting in maintaining proper phase synchronization of cookie motion, properly-timed dispensing of chocolate cementitious material and appropriately timed dropping of the upper biscuits upon the coated bottom cookie biscuits. Means are preferably also provided for exerting a slight pressing force to urge the two cookie biscuits of each sandwich toward each other, after the cementitious food material has been applied but before it completely sets or solidifies.

A sandwich cookie according to the invention comprises a first and a second biscuit cookie at least one of which is coated with a hardened layer of filler material, the first and second cookies being bonded together by a localized cementitious food material positioned between said biscuits; the cementitious material is preferably in the form of chocolate stripes on the hardened chocolate layer.

BRIEF DESCRIPTION OF DRAWINGS

These and other objects and features of the invention will be more readily understood from a consideration of the following detailed description, taken in connection with the accompanying drawings, in which:

FIG. 1 is a schematic side elevational view of a preferred embodiment of apparatus according to the present invention;

FIG. 2 is a schematic plan view of the apparatus shown in FIG. 1;

FIGS. 3a, 3b, 3c, 3d and 3e are perspective views showing the cookie sandwich in successive stages of manufacture in accordance with the invention;

FIG. 4 is an enlarged cross-sectional view of the top and bottom biscuits of the sandwich cookie as the top biscuit is dropping upon the bottom biscuit during manufacture;

FIG. 5 is an enlarged cross-sectional view of a completed sandwich cookie according to the invention;

FIG. 6 is a more detailed fragmentary side elevational view of the right-hand portion of the apparatus of FIG. 1;

FIG. 7 is a plan view of the apparatus of FIG. 6;

FIG. 8 is an enlarged fragmentary sectional view of a portion of FIG. 6, showing the lower stepping conveyor and the biscuit inverter;

FIGS. 8a–8d illustrate the operation of the biscuit inverter;

FIG. 9 is an enlarged transverse sectional view taken on lines 9—9 of FIG. 8, showing further details of the inverter;

FIG. 10 is an enlarged fragmentary sectional elevational view of the discharge end portion of the apparatus of FIG. 6 taken on the line 10—10 of FIG. 7;

FIG. 11 is an enlarged transverse sectional view taken on the line 11—11 of FIG. 6, showing further details of construction of the lower conveyor;

FIG. 12 is an enlarged transverse sectional elevational view taken along line 12—12 of FIG. 10, showing further details of supports and of the spring presser arrangement;

DETAILED DESCRIPTION OF SPECIFIC EMBODIMENTS

Figure 13:
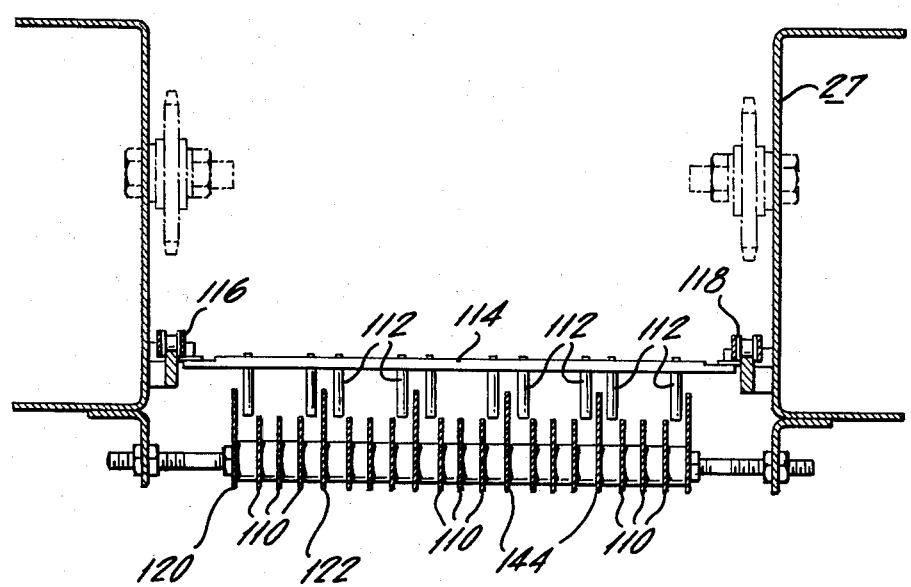
FIG. 13 is an enlarged transverse sectional elevational view of the upper conveyor, taken on the line 13—13 of FIG. 6.

Referring now to the preferred embodiment of the invention shown by way of example only in the accompanying figures, and without thereby in any way limiting the scope of the invention, FIGS. 1 and 2 show apparatus for receiving successive rows of 10 plain, uncoated cookie biscuits such as 10 and 12 and for making each row into five chocolate-filled cookie sandwiches 13.

The apparatus comprises the following broad components, in the sequence described. A cookie coater 14, often described as an enrober, receives successive sets of five cookie biscuits such as 12 and coats the bottom flat surfaces thereof with molten chocolate. These coated biscuits are passed through the cooler 16 on a cooler conveyor 10A, to cool each coating sufficiently to render it solid and adherent to the biscuit which it coats. The five biscuits 12 with the solidified chocolate layers on their bottoms are then delivered, five abreast, to lower infeed conveyor 17; the other five biscuits 10 in each row are not coated, and are supplied, five abreast, to the upper infeed conveyor 18, made up of two moving conveyor belts 18A and 18B. The upper and lower infeed conveyors supply the two five-biscuit-wide trains of biscuits to two respective stepping conveyors 20,21, which serve to move the biscuits in each train into a predetermined positional phase relation with respect to biscuits in the other train. The coated biscuits are then passed through an inverter 22 which turns them so that their chocolate coated surfaces are presented upwardly.

The upper and lower trains of biscuits then proceed farther along the conveyor, with the uncoated biscuits 10 positioned above the corresponding coated biscuits 12. In so doing, coated biscuits 12 in the lower train pass beneath a chocolate dispenser 26, which dispenses molten chocolate from five pairs of laterally spaced-apart nozzles such as 26A onto the upper surface of each previously-coated biscuit passing beneath them, to form a pair of parallel stripes of molten chocolate on each coated biscuit (see FIG. 3c). Before these chocolate stripes have cooled and set, the upper and lower biscuit trains are passed through the top aligner 27 and the bottom aligner 28, which act to positively position the upper and lower biscuits in exact vertical alignment with respect to each other, so that when they pass into the succeeding assembler section 29 each of the upper biscuits 10 can be accurately dropped upon the coated and striped top of the corresponding lower biscuit 12. The paired biscuits are then passed through a presser 30, which momentarily urges the upper and lower biscuits toward each other, with the still-unset but somewhat squashed chocolate stripes between them. The resultant successive sets of five cookie sandwiches are then passed through a final cooler 34, which cools the molten chocolate stripes so that they set and bond together the two biscuits of each sandwich. The applied chocolate stripes therefore act as a cementitious food material for accomplishing the bonding together of the two biscuits.

The process may be more fully understood from the showings of FIG. 3, depicting the cookie biscuits in different stages of fabrication of a final cookie sandwich. Thus, in FIG. 3a there is shown a bottom biscuit 12 being coated with chocolate on its lower surface as it moves along the surface of a chocolate bath 36 in the coater 14. The top biscuits do not dip into the bath and are not coated in the coater, nor elsewhere in the process in this embodiment. In FIG. 3b there is shown a bottom biscuit after it has passed through the coater 14 and the inverter 22, so that the molten chocolate layer has become a solid adherent chocolate layer 42 covering the flat face of the biscuit and presented upwardly.

In FIG. 3c the lower biscuit 12 is shown with the molten chocolate stripes such as 44 being applied thereto from the dispensing nozzles 26a and 26b of dispenser 26, at a time when dispensing has just been cut off so as to terminate the stripes at the upstream end of the biscuit. As will be described in more detail hereinafter, while the bottom biscuit 12 is being striped it is being pushed along support wires 46,46A by a pair of upstanding pusher lugs 48,48A which, as shown in FIG. 3d, at this point also bear against and push the upper biscuit 10 into exact vertical alignment with biscuit 12 by the time the two biscuits have reached the output section of the aligning conveyor 28.

FIG. 3d shows the upper and lower biscuits 10 and 12 after the upper biscuit 10 has been pushed from the end of the support rods 52,52A on which it has been sliding, so as to fall directly downwardly onto the coated and freshly-striped top of biscuit 12; in FIG. 3e, the resultant sandwich has advanced to a position beneath a spring presser 124 bearing against the top of the top biscuit, which provides a force in addition to the weight of the top biscuit to urge the two biscuits gently toward each other. This sandwich, after cooling, constitutes the final sandwich cookie.

FIG. 4 shows a cross-section of the cookie sandwich as the top biscuit is just dropping against the bottom biscuit, while FIG. 5 shows the final sandwich after it has been compressed by the spring presses and cooled in the final cooler 34. In FIG. 5 the thickening of the chocolate filler in the region of the stripes 44 can be seen, as well as the intimate bonding contact between the stripes and the upper biscuit in contrast to the unbonded areas of the two biscuits outside of the striped areas. The existence and configuration of these bonded areas can also be determined by successively breaking away those portions of the cookie which are outside of the bonded areas.

Referring now to the mechanical details of the preferred embodiment of the apparatus according to the invention, the coater 14 and the cooler 16 may be known conventional devices, and hence are not shown in detail. Their combined function is to provide automatically a suitable thin solidified chocolate layer adhering to the flat undersurface of each of the biscuits 12. Commercial enrobers are available to perform the coating function, and suitable coolers are also commercially available.

In one embodiment of the invention, at the output of the cooler successive transverse rows of twenty cookies each are provided, which may be considered as divided into groups of five as follows: two outer sets of five each may be chocolate-coated "bottom" biscuits, while two inner groups of five may be uncoated or "top" biscuits. Such apparatus has mirror symmetry about a vertical longitudinal plane through its center, so that the five uncoated "top" biscuits and five coated "bottom" biscuits on one side of that plane are formed into five sandwich cookies, and similarly for the five "top" biscuits and five "bottom" biscuits on the other side of the plane. Accordingly, for simplicity there are shown, and will be described herein, only one-half of such apparatus, for making five sandwich cookies at a time rather than ten, it being recognized that the apparatus may be constructed in the above-described double form, and that even more conveyors may be provided in parallel with those depicted in FIGS. 1 and 2.

Following this line of description then, as shown in FIGS. 1 and 2, successive sets of five uncoated "top" biscuits 10 are conveyed through the coater 14 without descending into the chocolate, then through cooler 16, and next along upwardly extending belt 18a and downwardly-extending belt 18b, while successive sets of five coated "bottom" biscuits 12 are conveyed somewhat downwardly along conveyor belt 17. The latter belt 17 constitutes the infeed conveyor for the lower train of biscuits, delivering the biscuits to the lower stepping conveyor 21; the upper conveyors 18a,18b serve as the infeed conveyor for transferring the upper train of biscuits to the upper stepping conveyor 20.

The remainder of the system is shown in more detail in FIGS. 6 and 7 and the succeeding figures, to which reference is now made.

The two stepping conveyors 20 and 21 may be substantially identical, the details of lower stepping conveyor 21 being shown particularly clearly in FIGS. 8 and 9. Such stepping conveyors are known in the art for similar purposes of establishing a definite predetermined phase position for objects being conveyed, and hence need not be described in great detail. In general, conveyor 21 constitutes a set of horizontal, spaced-apart stationary plates or steps 61A, 61B, 61C and 61D positioned below the downstream exit end of conveyor 17, and an interdigitated set of reciprocable pusher plates 62A, 62B, 62C, which also are horizontal and which are located between the stationary plates.

It will be understood that the above-described infeed conveyor belts (FIG. 6) are driven by a chain-drive motor 64, which is electrically synchronized with the main drive motor 68 driving the main line shaft 70. The latter shaft mechanically synchronizes the speed and phase of the remainder of the moving elements of the conveyor system. Thus, the reciprocable pusher plates 62A, 62B, 62C are driven from the main shaft through direction changer 74, crank 75, connecting rod 75A, and appropriate gearing to achieve the desired constant uniform flow of cookie biscuits through the system. This synchronization with the main line shaft is maintained for all moving elements in the conveyor which affect the position of the cookies.

The function of the stepping conveyors 20 and 21 is to provide accurate control of the exact positional phase of the biscuits 10 in the upper train, relative to those in the lower train. In the case of stepping conveyor 21, for example, the biscuits fall, one by one, onto the top reciprocating pusher plate 62A while it is fully advanced to the position shown in broken line; when the top plate retracts to its full-line position, the biscuit is wiped off the forward end of the pusher plate by stationary plate 61A, onto the next successive stationary plate 61B when the pusher plate 62A again advances, it pushes the biscuit from stationary plate 61B onto the next-lower pusher plate 62B, and so on, until the biscuit is discharged from the final stationary plate 61D to the inverter 22 and at a predetermined time with respect to the operation of the pusher plates, as desired.

At the input ends of stepping conveyors 20 and 21 there are preferably employed respective slowly-rotating brushes 84 and 86, the peripheries of which move over the tops of the biscuits along the downstream direction at approximately the speed of the infeed belt, bearing lightly against the underlying biscuit while it is being transferred from the conveyor belt to the first pusher plate so as to control and assure the desired transfer. A fixed brush 89 is preferably positioned adjacent the output end of stepping conveyor 21, to lightly brush against the tops of the biscuits passing beneath it, so as to damp the motion of these biscuits and assure that they will remain in contact with the lowest pusher plate as they exit from the stepping conveyor, rather than sliding ahead of it, for example.

Adjacent the output end of the lower stepping conveyor 21 is the biscuit inverter 22, which is not per se the invention of the present applicant, but which cooperates in a novel fashion in the present combination to receive the train of biscuits from the stepping conveyor 21 with their chocolate-coated sides facing downwardly, to invert them, and to discharge them onto the aligning conveyor 28 with their chocolate-coated sides facing upwardly.

As shown more clearly in FIG. 9, the inverter comprises a plurality of parallel, spaced-apart plates 90 mounted on a rotatable shaft 91 and a set of stationary stripping plates 92 interposed between and parallel to the bottom portions of the rotatable plates. Partitioning plates 93 separate the inverter into five lanes or aisles, one for each of the five-abreast biscuits. The rotatable plates are provided with pairs of recesses such as 96 and 98 into which the biscuits of the lower train are delivered synchronously, one in each recess, by the stepping conveyor 21. The latter conveyor provides the timing necessary for this transfer to be made, with each recess becoming appropriately aligned with the output of the stepping conveyor at the right time to receive the next biscuit from the stepping conveyor 21 as the plates rotate.

FIGS. 8a, 8b, 8c and 8d show the inverter in successive angular positions during a cycle of its rotation; as the inverter plates rotate, each biscuit is held in its corresponding recess and is turned over to lie on its uncoated side, so that its coated side faces upwardly when it falls from the recess onto the aligning conveyor 28. The stationary plates 92 serve to assure that the biscuits are always stripped from their recesses at the same predetermined angular phase of the rotating plates, by blocking further rotational motion of the biscuits.

The aligning conveyor 28 preferably extends somewhat upwardly, and comprises a pair of endless lugged chains such as 100 carrying cross-bars such as 102 which support pairs of lugs such as 104, extending upwardly from the upper run of the chain 100, one pair of lugs for each biscuit which is to be pushed along the conveyor. The slight upward tilt of the conveyor assures that the biscuits will remain against the conveyor lugs, rather than at times running slightly ahead of them, thereby assuring exact positioning of the biscuits with respect to the lugs. During this aligning conveyance of the biscuits, each of them slides upon a pair of underlying wires such as 46,46A, in response to pushing by the lugs.

Figure 14:
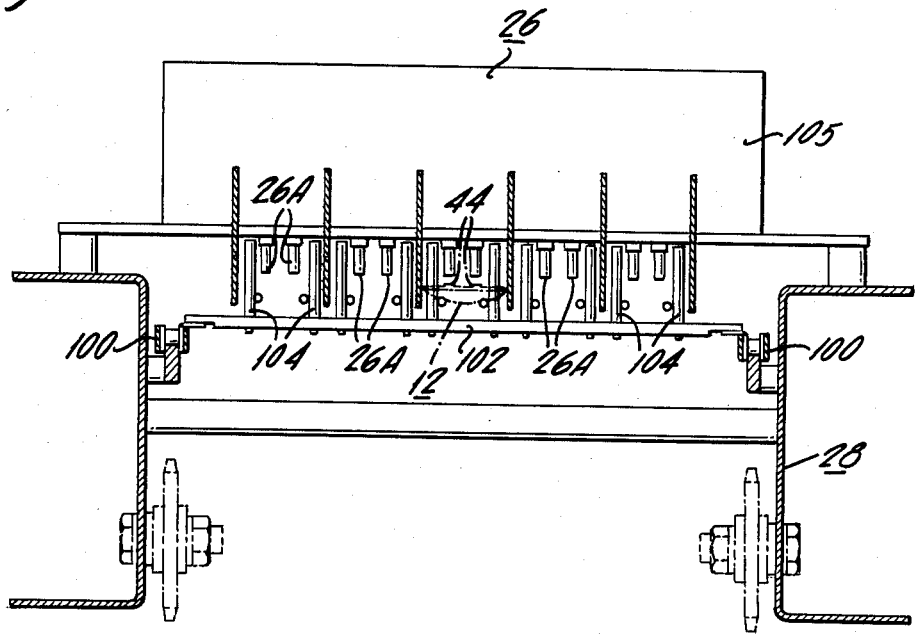
FIG. 14 is an enlarged transverse sectional elevational view taken on the line 14—14 of FIG. 6, showing the chocolate dispensing arrangement.

The bottom train of biscuits 12 is moved by the lugs below and past the molten chocolate dispenser 26 (see FIG. 14), which contains molten chocolate maintained at an optimum temperature of about 92°, or somewhat less, by means of warm water circulating through an appropriate water jacket in the chocolate dispenser chamber 105. The latter chamber is provided with a pair of nozzles such as 26A, 26B etc. on its lower face, one pair for each row of biscuits passing beneath it, the nozzles of each pair being transversely spaced apart so that, when open, they will dispense molten chocolate in the form of a pair of parallel stripes 44 (FIG. 3c) onto the tops of the underlying biscuits 12. The valves for turning the nozzles on and off are synchronized with the other elements of the conveyor system by means of cams 106 mounted to a cam shaft 108 (FIG. 6) synchronized with the main line shaft. The striped bottom biscuits are then pushed along by the lugged chain assembly to the sandwich assembler section 29.

Meanwhile, the uncoated top biscuits from the upper stepping conveyor 20 are delivered synchronously onto the upper aligning conveyor 27, which comprises pairs of vertical plates 110 (FIG. 13) forming a track beneath each cookie biscuit, and a plurality of lugs such as 112 mounted on cross-bars such as 114 which extend between a pair of endless chains 116,118; the chains are positioned above the top rows of cookie biscuits, with the lugs on the lower run extending downwardly from above to serve as pushers for the top biscuits. Partition plates such as 120,122 serve as side guides defining the lanes through which each train of biscuits is pushed.

In the assembler section, as shown in FIGS. 10 and 12, the top aligning conveyor 27 delivers the top biscuits onto a horizontal shelf formed by rods 52,52A, with each top biscuit positioned just ahead of a pair of upstanding lugs 48,48a on the lower set of cross-bars, so that each top biscuit is quickly contacted by such pair of lugs and pushed along in exact vertical alignment with the corresponding lower biscuit. Accordingly, when the upper biscuits reach the ends of rods 52,52A, they fall downward along lugs 48,48A onto the corresponding lower biscuits and are accurately positioned thereon as desired.

As shown in FIG. 10, the completed sandwich of upper and lower biscuits is then conveyed by the lower set of lugs through the presser section 30, comprising a plurality of longitudinally-extending strip spring members such as 124, one for each lane of cookies, which pressers apply a slight pressure urging together the upper and lower biscuits as they pass beneath and against the spring members so as to assure good bonding contact between the still-unset chocolate stripes and the biscuits. The lugs then discharge the assembled and pressed sandwich cookies over a ramped output slide 126 onto the conveyor belt 128 of the final cooler 34, which may be of conventional form, and which provides a sufficiently low temperature to cool the molten chocolate stripes and assure their proper setting, thus bonding the upper and lower biscuits to each other as desired for the final sandwich cookies. The ramped output slide 126 assures that the cookies will move out of the way of the pusher lugs, and the lugs therefore will not damage the sandwich cookies, as the cookies leave contact with the lugs at the output of the lower conveyor.

Figure 15:
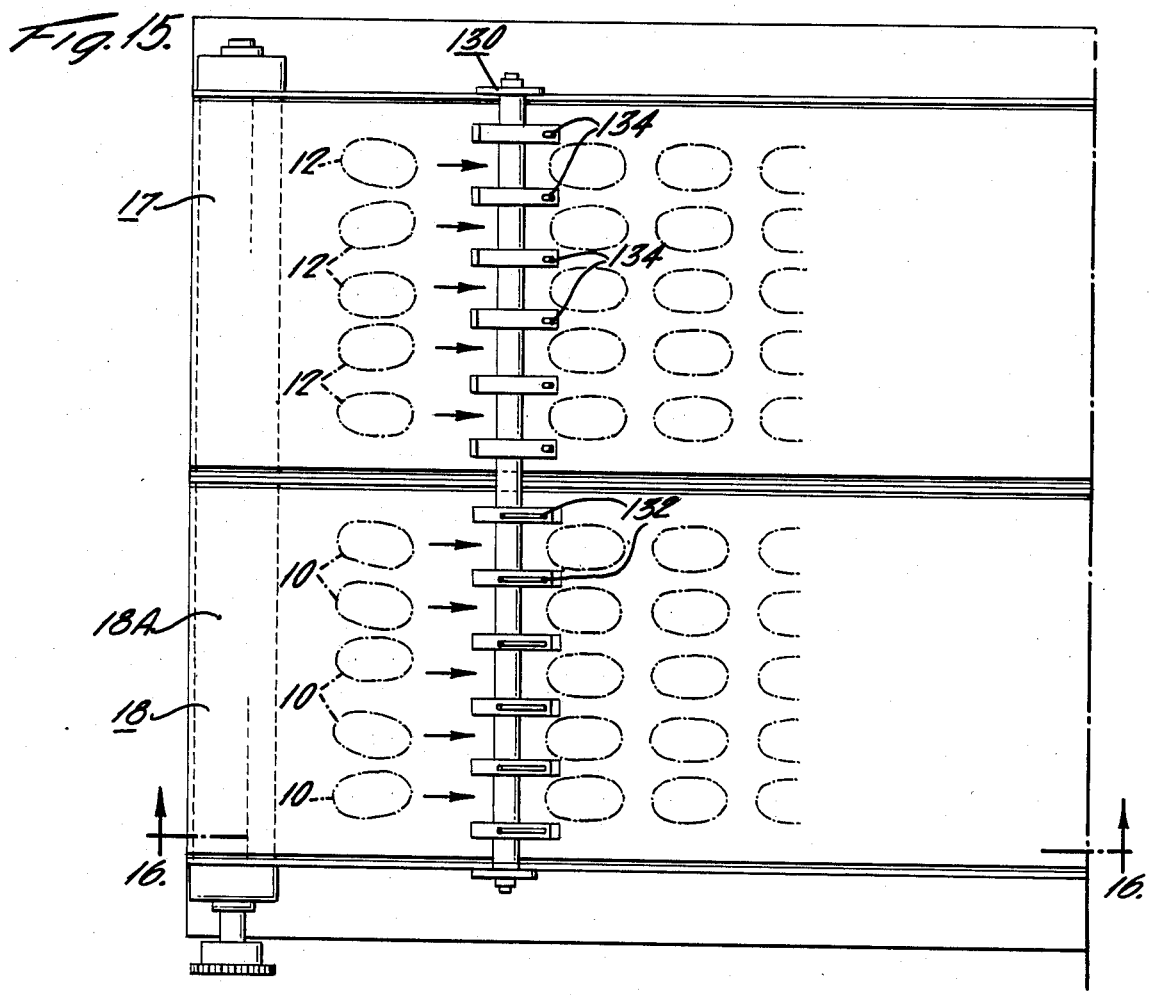
FIG. 15 is an enlarged fragmentary plan view of the input end of the belt conveyors, taken along lines 15—15 of FIG. 1.
Figure 16:
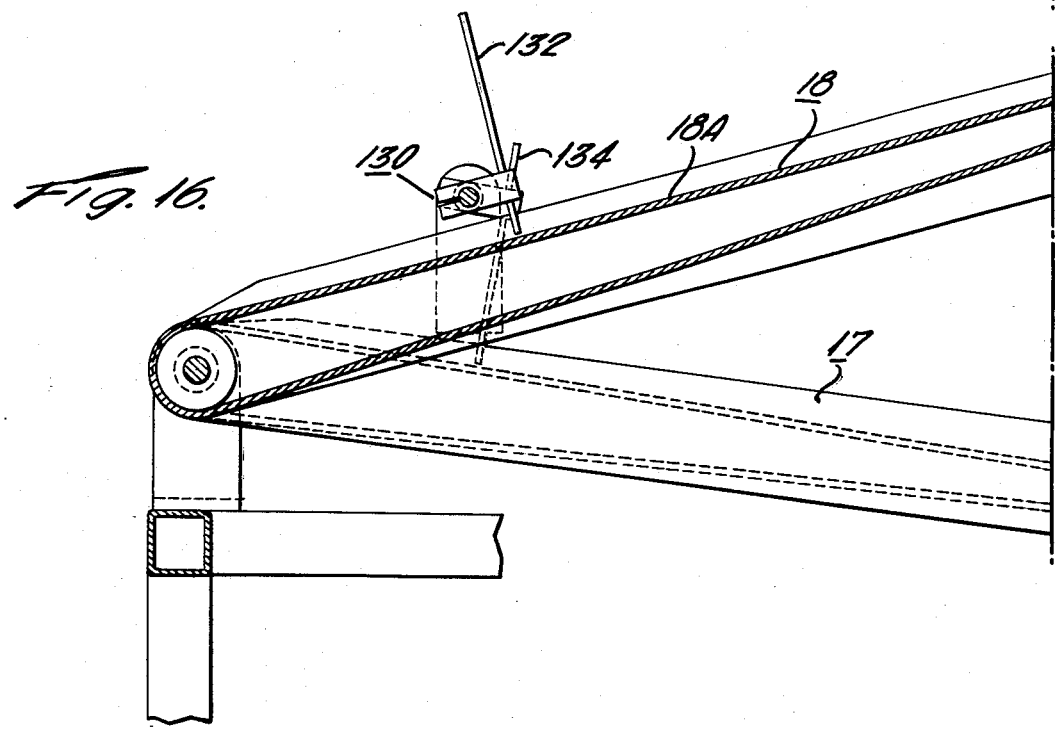
FIG. 16 is an enlarged fragmentary sectional elevational view taken on the line 16—16 of FIG. 15.

Still other details of the preferred construction are also shown in various of the figures. FIGS. 15 and 16 show a bridging structure 130, extending across the input end of the infeed conveyor belt 18a and supporting a plurality of vertical rods such as 132, which rods extend downwardly just short of the top of the conveyor. Adjacent rods are laterally spaced from each other by a distance slightly greater than the widths of the cookie biscuits, so as to define the desired five aisles or lanes for the biscuits, and to correct any minor misalignment or mispositioning of the trains of biscuits as they pass between the rods. A similar arrangement of rods 134 is preferably used at the input end of the infeed conveyor 17, for similar purposes.

As shown in FIG. 6, the molten chocolate for the stripe dispenser may be stored in a heated-chocolate tank 136, and fed through a pump 138 to the chocolate inlet pipe 140 of dispenser 26. The heating of the water for the water packet of the chamber may be accomplished in a tank 142 by means of an appropriate thermostatically-controlled heater (not shown).

Lane guides 144 in the form of metal rods may also be provided as shown in FIG. 7 to assist in guiding the top biscuits 10 from upper conveyor 18b onto the upper stepping conveyor 20.

While in the embodiment shown in the drawings the bottom biscuit is coated substantially entirely, the top biscuit is uncoated, and the cementitious material is applied in stripes to the coating on the bottom biscuit, the invention may be quite differently embodied. For example, both biscuits may be coated with chocolate; the cementitious material may be applied to the top biscuit and/or to both biscuits; and the cementitious material need not always be chocolate.

Thus while the invention has been described with particular reference to specific embodiments thereof in the interest of complete definiteness, it will be understood that it may be embodied in forms diverse from those specifically shown and described, without departing from the spirit and scope of the invention as defined by the appended claims.

What is claimed is:

1. Apparatus for making a sandwich cookie comprising a first and a second cookie biscuit and a layer of edible filler between one side of said first cookie biscuit and one side of said second cookie biscuit, said apparatus comprising:
   (a) coating means for forming a solid adhering coating of edible material on said one side of said first cookie biscuit, said coating having a non-adhesive exposed surface ineffective in itself to produce bonding to said second cookie biscuit;
   (b) means for applying to a part only of at least one of said sides of said first and second biscuits a molten deposit of an edible material which solidifies when left at room temperature;
   (c) means for urging said first and second biscuits against each other with said one sides of said cookie biscuits confronting each other and with said molten deposit and said coating between them, before said deposit has solidified; and
   (d) means for thereafter causing said molten deposit to solidify in situ;
   (e) said molten deposit having the property, when solidified, of bonding said biscuits to each other to form said sandwich cookie.

2. The apparatus of claim 1, wherein said coating is of chocolate material and said molten deposit is a warmed chocolate material and said means for thereafter causing said molten deposit to solidify comprises means for cooling it.

3. The apparatus of claim 1, comprising means for moving said first and second cookie biscuits along parallel paths, aligned one above the other just prior to urging them together, and wherein said means for urging said first and second biscuits against each other comprises means for dropping the upper one of said first and second cookie biscuits into the corresponding lower one of said cookie biscuits with said coating and said molten deposit between them.

4. The apparatus of claim 3, wherein said means for urging said first and second cookie biscuits against each other comprises means for moving said sandwich cookie along a predetermined path before said molten deposit has solidified, and spring means extending along said predetermined path so as to bear momentarily downwardly against the top of said second biscuit of said sandwich cookie before said molten deposit has solidified.

5. Apparatus for making sandwich cookies each of which comprises a first cookie biscuit, a second cookie biscuit, and an edible chocolate-containing filler material between them, said apparatus comprising:
   (a) first means for forming a first moving train of first cookie biscuits-each having a solidified chocolate layer extending over and adhering to its upwardly-presented face, and for moving said first biscuits along a first path, said layer having a non-adhesive exposed surface;
   (b) second means for forming a second moving train of second cookie biscuits and for moving them along a second path;
   (c) dispensing means for dispensing a deposit of molten chocolate upon part of each of said solidified chocolate layers on said first cookie biscuits;
   (d) means for vertically aligning each of said moving second cookie biscuits directly above a corresponding one of said moving first cookie biscuits, after said molten chocolate deposit has been dispensed onto said corresponding first cookie biscuit;
   (e) means for placing each of said second cookie biscuits upon the corresponding first cookie biscuit before said molten chocolate deposit has set; and
   (f) means for thereafter cooling said molten chocolate deposit to solidify it, said solidified chocolate material having the property when it sets of bonding said first and second cookie biscuits to each other to form said sandwich cookies.

6. The apparatus of claim 5, comprising means for cooling said molten chocolate deposit after said depositing of said second biscuits upon said first biscuits to effect solidification thereof.

7. The apparatus of claim 6, wherein said dispensing means comprises means for dispensing said molten chocolate deposit upon the chocolate layer of each of said first cookie biscuits as it passes beneath said dispensing means to form at least one stripe of said molten chocolate on said first cookie biscuit.

8. The apparatus of claim 5, comprising spring means for urging each of said second cookie biscuits of said sandwich cookies toward its corresponding first cookie biscuit before said molten chocolate deposit has set.

9. The apparatus of claim 5, wherein said cookie biscuits in said first train are initially positioned with their solidified chocolate layers facing down, and said apparatus comprising inverting means for receiving each of said first cookie biscuits, turning them so that the solidified chocolate layers thereof face upwardly, and then discharging them in the latter position, said inverting means comprising a turning wheel which rotates about a horizontal axis extending substantially normal to the direction of motion of said first train, said turning wheel comprising a shaft rotatable about said axis and a plurality of thin metal plates mounted on said shaft, each of said plates being cut away to form a biscuit-receiving recess in said wheel for receiving each of said first biscuits, said inverting means also comprising a plurality of stationary plates extending between the lower portions of said rotatable plates for arresting said first biscuits as said recess reaches its lowermost position, thereby to assist in discharging said inverted first biscuits at a fixed predetermined position along said first path as said recess passes through its lowermost position.

10. The apparatus of claim 5, comprising a pair of stepping conveyor means, one supplied with said first biscuits and the other with said second biscuits, each for accurately adjusting the position of each of said first and second biscuits along said first and second paths, each of said stepping conveyor means comprising a plurality of stationary horizontal steps and a plurality of horizontally-reciprocable pusher plates extending between said steps in line with said biscuits when they are on said steps, the strokes of said progressively lower pusher plates sufficiently to push each biscuit off of the next underlying stationary plate, whereby at the output of each stepping conveyor each biscuit is pushed off the bottom step of the conveyor at a predetermined time.

11. The apparatus of claim 5, comprising means for aligning said first and second biscuits with each other, said last-named means comprising a first set of chain-mounted lugs for pushing said first biscuits along said first path, a second set of chain-mounted lugs for pushing said second biscuits along said second path above said first path up to a predetermined position, said first set of chain-mounted lugs extending downstream beyond said predetermined position, each of said lugs of said first set extending sufficiently upwardly, beyond said predetermined point, to bear against and simultaneously push the trailing sides of each of said first biscuits and the corresponding one of said and second biscuits.

* * * * *